United States Patent
Harris et al.

(10) Patent No.: US 7,551,766 B2
(45) Date of Patent: Jun. 23, 2009

(54) APPARATUS AND METHOD FOR INSPECTING GOLF BALLS USING THRESHOLD ANALYSIS

(75) Inventors: Kevin M. Harris, New Bedford, MA (US); William Brum, Raynham, MA (US); Brian P. St. Aubin, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 515 days.

(21) Appl. No.: 11/096,884

(22) Filed: Apr. 1, 2005

(65) Prior Publication Data

US 2006/0222231 A1    Oct. 5, 2006

(51) Int. Cl.
  *G06K 9/00* (2006.01)
  *C23C 14/54* (2006.01)
(52) U.S. Cl. .............................. 382/141; 427/9; 427/10
(58) Field of Classification Search .............. 382/141, 382/152, 194, 168, 172; 427/8, 9, 10
See application file for complete search history.

(56) References Cited

U.S. PATENT DOCUMENTS

| | | | |
|---|---|---|---|
| 5,077,806 A * | 12/1991 | Peters et al. | 382/141 |
| 5,454,049 A * | 9/1995 | Oki et al. | 382/172 |
| 5,777,244 A | 7/1998 | Kumagai et al. | |
| 6,031,933 A * | 2/2000 | Kumagai | 382/141 |
| 6,271,520 B1 | 8/2001 | Tao et al. | |
| 6,462,812 B1 | 10/2002 | Heene et al. | |
| 6,630,998 B1 * | 10/2003 | Welchman et al. | 356/394 |
| 2001/0012389 A1 | 8/2001 | Welchman et al. | |

* cited by examiner

*Primary Examiner*—John B Strege
(74) *Attorney, Agent, or Firm*—William B. Lacy

(57) ABSTRACT

A method for inspecting golf balls is disclosed. An imager such as a camera captures a digital image of the golf ball. The golf ball image is separated into regions, and a brightness level is determined for each region using a histogram tool. The brightness level of the region is compared with a reference level. If the brightness level of the region is significantly different from the reference level, then the golf ball is diverted. The regions are located from image to image using pattern matching and/or edge finding tools. The environmental light conditions are altered to facilitate the pattern matching and edge finding.

27 Claims, 4 Drawing Sheets

APPARATUS AND METHOD FOR INSPECTING GOLF BALLS USING THRESHOLD ANALYSIS

FIELD OF THE INVENTION

This invention generally relates to visually inspecting golf balls and more specifically to visually inspecting golf balls using a threshold analysis system.

BACKGROUND OF THE INVENTION

The manufacture of golf balls typically involves a series of sequential processes performed at different processing stations, spatially separated one from another. Golf balls typically have at least a core and a dimpled cover formed over the core. The outer cover of the golf ball is formed with various materials, such as urethane elastomers, urea, balata, ionomers or any other appropriate materials. The cover surfaces are formed with dimples of various numbers, sizes and patterns, which improve flight distance, control and stability. The golf ball cover generally contains a white or other colored concentrate, or is painted. The outer surface of the ball covers usually have the manufacturers indicia painted thereon, as well as an application of a paint or clear coat for good appearance, improving flight distance and protecting of the indicia imprinted thereon.

Freshly coated golf balls are transported from a clear coat spray paint booth to a separate drying station at a remote location. Additional printing, such as a logo, may be applied over the cured clear coat.

Each process must be carefully monitored for quality assurance purposes. Inspections based on predetermined control criteria are performed to achieve a desired production quality. The manufacturer can manually inspect the entire lot if a given number of defective balls are found therein. Moreover, if a major defect, such as a gross cosmetic defect or a defect affecting performance or durability, is found, the manufacturer may choose to shut down the entire system.

Since automated production is faster and less expensive, each of the above processes can be performed at a separate automated processing station functioning at optimal efficiency and speed, so that the overall production rate is maintained at the desired high level. For instance, pad-printing apparatus preferably includes an array of print-pads arranged to apply a production print sequentially on various locations on the surface of the golf ball, with the golf ball being indexed before being passed to the next print-pad. Also, the clear coating process preferably is performed by an automated spray painting technique utilizing a spray paint booth with one or more spray paint guns. A quick drying clear coat paint having a catalyzing agent may be used to reduce the usual clear coat drying time of about ten hours to about one hour or less.

On the other hand, automation of the manufacturing process may cause various manufacturing defects. For example, automated pad-printing equipment may leave smudges from excess ink carried by the printing pad. Vibration or improper set-up, such as improper positioning or accidental switching of the paint supply hoses cutting off paint supply to the spray guns, causes defective coating on golf balls. Moreover, the clear coat paint may periodically clog the spray booth filter, interfering with proper spraying of paint.

While clear coat spray painting operation utilizing catalyzation can significantly reduce the curing time, catalyzation can also occur in the spray booth, resulting in a thick brittle coating on the spray booth filter and increasing the probability of spray paint malfunctions. Clogging of spray guns and gelling of the clear coat during application result in inadequate clear coating of the golf ball. Moreover, transferring the freshly coated golf ball to the curing station before inspection does not alert the operator to attend to unacceptable spray painting apparatus conditions until the end of the curing process. Thus, to maintain high production rates, it is necessary to identify the defective products early in the treatment process.

Given the quality control necessary to meet production standards and the high production rates of golf ball manufacturing plants, actions to correct a malfunction in the automated processing equipment should be taken as soon as possible. Accordingly, there is a need for speedy and efficient inspection of golf balls so that any manufacturing problem may be corrected early to reduce further production of defective balls.

A variety of automated inspection systems and methods are used in quality control of automated processing stations, such as for coating, finishing, or otherwise affecting the surface appearance of products. Most of the known automated inspection systems employ vision cameras to capture an image of the products. The products to be inspected are typically illuminated to allow the cameras to see the entire products, e.g., dimpled golf balls are illuminated to prevent shadows from forming in the dimples. U.S. Publ. App. No. 2001/0012389 discloses another golf ball inspection system using a custom lighting system. U.S. Pat. No. 5,777,244 discloses an elaborate system to illuminate golf balls. U.S. Pat. No. 6,462,812 discloses an inspection utilizing a plurality of charge-coupled device (CCD) cameras to inspect indicia on golf balls. CCD is an integrated circuit that converts light to electrical signals. A digital camera using CCD can comprise millions of pixels. U.S. Pat. No. 5,960,098 discloses a vision system for inspecting fruits. This system also utilizes CCD cameras, albeit with an infrared lens, to capture the images of fruits.

At least one vision inspection system employs infrared cameras for inspection. U.S. Pat. No. 6,271,520 discloses a system for inspecting fruits. This system uses a first camera in the near IR range and a second camera in the mid IR range to capture images of the products to be inspected. The background information is removed and the two images are subtracted leaving the defects. Another drawback of this system is that at least a portion of the exterior surface of the products to be inspected must be raised about 5° C. to 15° C. higher than ambient conditions.

U.S. Pat. No. 6,630,998 discloses light-emitting diodes mounted over the golf balls to be inspected to provide constant and even light sources. In addition to using non-ambient light sources for even lighting, the '998 patent discloses the use of ultraviolet lighting in order to detect the presence of a substance, such as a coating, applied to the surface of a golf ball. Images of the golf ball are captured by a detecting apparatus and then analyzed using discrete element detecting algorithm and industry standard blob analysis. Standard blob analysis tools count the number of discrete elements in the viewing area. This technique uses an algorithm to create a boundary outline around each discrete element being inspected. The boundary is broken down, such as into small line segments and arcs, to create a geometric representation which may be modified based on a best fit algorithm to match the object being inspected to a reference image. The algorithm then searches for breaks or significant changes in contour along the boundary, missing ink inside each boundary, and excess ink, marks, smudges, or doctor blade marks outside each boundary. Additionally, the boundary detection algorithm may calculate the relative positions of pairs of indicia, such as a logo and a number, to assure correct positioning. This is done by comparing the pattern detected in an inspection image with a predefined reference pattern. In a vision inspection system, the discrete element typically is identified as a continuous area of dark pixels exceeding a specified gray scale value without a break.

Many golf balls also have a coating over the white paint layer. For example, urethane or Surlyn® is often used. These coatings may produce sufficient brightness that analytical tools such as blob analysis that look for contiguous areas of brightness are relatively inaccurate. Therefore, there remains a need in the art for additional methods for interpreting images in vision inspection systems.

SUMMARY OF THE INVENTION

A method for inspecting an object is provided herein. At least one sensor capable of obtaining images of an object is provided, and an image of the object is obtained using the sensor after a surface treatment has been applied to the object. The image comprises an array of pixels and each pixel is represented by a numerical value indicative of a brightness level of each pixel. A determination of whether the surface treatment was applied evenly on the surface of the object is made using, wherein a threshold analysis tool is employed to analyze the image.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
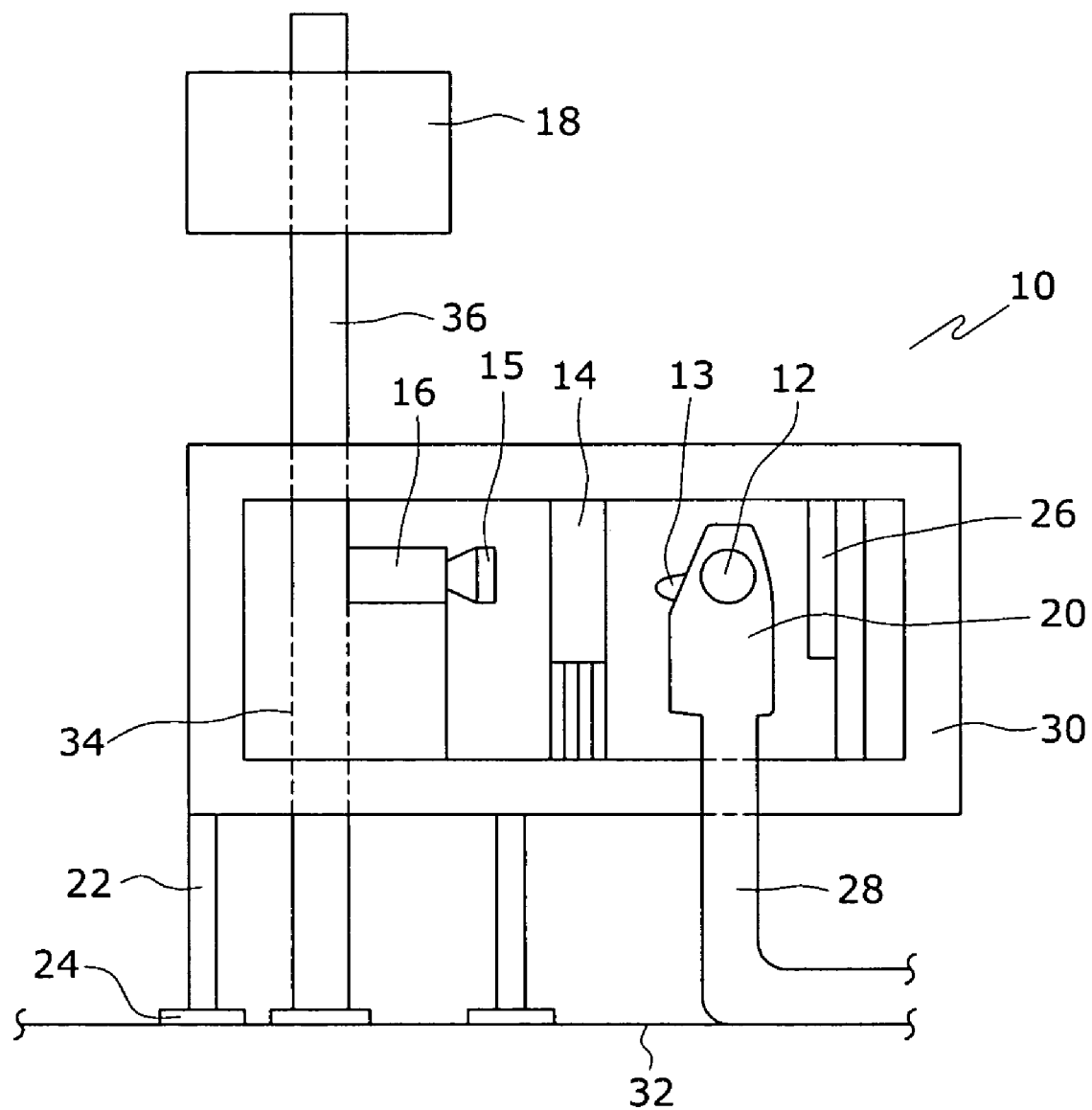
FIG. 1 is a schematic front view of a vision inspection system according to the present invention.

As shown schematically in FIG. 1, the present invention relates to the modification of or addition to one or more automated game ball processing stations of a ball manufacturing process to include an automated inspection system 10. Automated inspection system 10 permits continuous, objective inspection of all of the balls being processed by automated processing apparatus without interrupting or slowing down or otherwise interfering with processing and production of the balls. Automated inspection system 10 not only provides important information for use in quality control, but also permits further automated actions to be taken with respect to the balls being processed, as described herein. Thus, in accordance with the principles of the present invention, the ball manufacturing process is further streamlined and production speed and efficiency are increased.

In a preferred manufacturing process according to the present invention, the automated processing station provides a surface treatment for golf ball 12 during the manufacture of golf balls. For example, processing apparatus may treat the surface of golf ball 12 by applying a substance such as primer, coating, ink or paint thereto. Preferably, an optical brightener is also included in the surface treatment, in order to facilitate the vision inspection process. After treatment, golf ball 12 is transferred, preferably by an automated transferring mechanism, directly to automated inspection system 10 which is positioned downstream along the production line.

Figure 2:
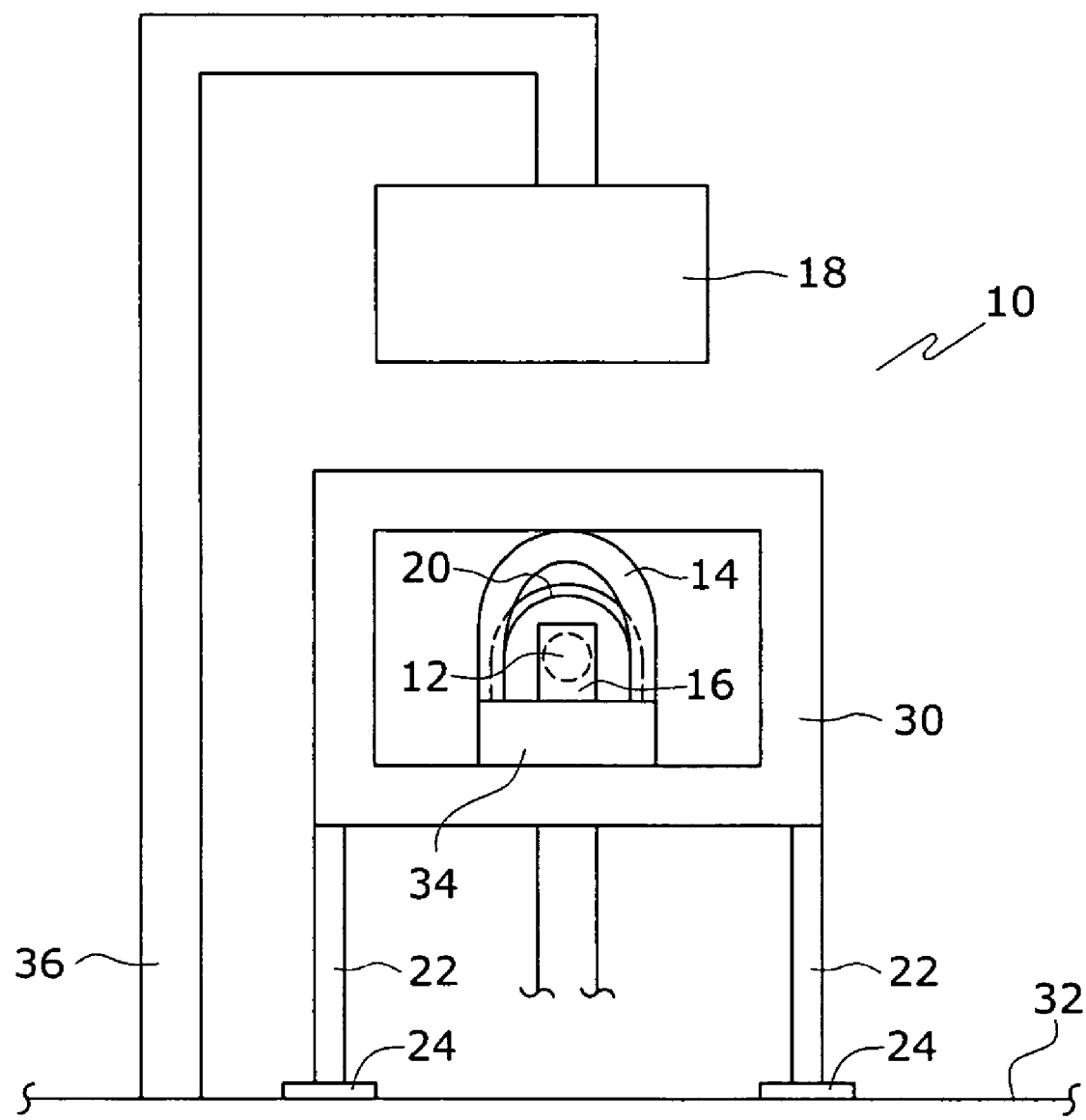
FIG. 2 is a schematic side view of the vision inspection system shown in FIG. 1.

Referring to FIGS. 1 and 2, in a preferred embodiment, automated inspection system 10 comprises an imager 16 and an automated analyzer 18 linked together preferably via an electronic link that runs through or on a vertical support 36. Analyzer 18 determines whether or not golf ball 12 has been appropriately coated, preferably using a threshold analysis tool, such as a histogram analysis and pixel counting tool, a blob tool, binarization or any other method to determine the number of pixels above or below a certain threshold value within a region of interest which is described in greater detail herein. Imager 16 is mounted on a riser 34 that positions imager 16 on a line-of-sight relationship with golf ball 12 in a ball holder 20. Ball holder 20 is preferably a tube through which golf ball 12 travels. The side of ball holder 20 facing imager 16 is preferably removed so as to provide imager 16 with a clear view of golf ball 12.

Riser 34 and ball holder 20 are preferably mounted within a system support frame 30. System support frame 30 is then attached to a support surface 32, such as a floor, via several supports 22. Anti-vibration mounts 24 are preferably used to affix supports 22 to support surface 32, so that a clear image of golf ball 12 may be obtained even if support surface 32 is shaken, such as by the operation of processing equipment.

A product sensor 13 may also be included to trigger the inspection and analysis process. Product sensor 13 is used to prevent extraneous information (such as a scan of an empty space without a golf ball) from being transmitted and analyzed by analyzer 18 so that statistics on acceptable and defective golf balls being scanned will not be skewed. Product sensor 13 may be any desired sensor, such as an optical or magnetic sensor that detects the presence of an object within range of the imager 16, a fiber optic through beam product sensor which transmits a signal upon the passing of an object across its beam, a photoelectric eye, or a proximity switch.

Because the different features of a golf ball to be analyzed may not be readily viewed by a commercially available imager 16 because of certain viewing or environmental conditions, particularly if under ambient conditions, various environment modification devices may be provided to modify inspection conditions and thereby facilitate capturing the image of golf ball 12 by imager 16. As described in greater detail below, environment modification device 14 may, for example, include a custom lighting system which alters the lighting conditions so that visual features of the exterior surface of the golf ball or a substance applied to the exterior surface of the golf ball can be properly detected by imager 16. In one embodiment, environment modification device 14 utilizes a plurality of LEDs in different colors to achieve greater and more intense illumination of golf ball 12, such as for facilitating inspection of printed matter on the surface of golf ball 12. In that case, the LED colors are red, green, and blue so that in combination a white light is produced. More preferably, however, environment modification device 14 is a fluorescent circular illuminator that provides uniform lighting of golf ball 12. An appropriate environment modification device 14 is Model 10 CFVI High-Frequency Illuminator available from StockerYale of Salem, N.H. Additionally, a light screen 26 is preferably placed behind golf ball 12. Light screen 26 enhances the overall brightness of the environmental conditions and helps to eliminate shadows on golf ball 12.

Optionally, a filter or series of filters 15 may be included between imager 16 and light source 14 or golf ball 12 to enhance the image.

Imager 16 is preferably a camera although other detecting apparatus such as a photocell are also appropriate. Imager 16 is more preferably a camera that detects and records images in the visual range, such as a color or black and white camera. Alternatively, imager 16 may be an electronically shuttered CCD camera that captures images in the ultraviolet or infrared spectra. An appropriate camera for use with the present invention is the In-Sight® 1000C vision sensor having an integrated processor available from Cognex Corporation of Natick, Mass. Imager 16 either captures a digital image or captures an analog image and processes the analog image into a digital image for transmission to analyzer 18. The image captured may be either gray scale or in color.

In the preferred embodiment, imager 16 views and detects golf ball 12 to be inspected and provides a detection signal, such as an image of golf ball, into automated analyzer 18. Analyzer 18 receives the detection signal and uses the signal to perform various analysis tasks such as analysis of the signal, statistics processing, task scheduling, generation of reject signals or further control signals, and/or alarms. Analyzer 18 is preferably placed so that an operator has easy and quick access to both the analyzer 18, to determine the defect, and the production line, to attend to and to correct the cause of the defect.

Imager 16 preferably supplies high resolution images to analyzer 18. The physical resolving power is dependent on the field of view of imager 16 and distance from the ball surface. For instance, a one square inch field of view can be depicted by hundreds of thousands of pixels, each having a wide range of colors or shades of gray. Thus, differences in golf ball color or shading, such as caused by the application of a surface treatment such as a coating, ink or paint to the golf ball surface, may be detected electronically.

A variety of inspection routines may be performed by analyzer 18, such as finding the center of the product, checking overall dimensions and contours, inspecting for contamination, and/or determining various characteristics of a surface treatment such as an application of a substance (e.g., primer, coating, ink or paint) to the surface of the golf ball. Because a variety of different aspects of the golf ball are inspected and analyzed, different areas on the surface of the golf ball must be inspected, and a variety of different, potentially overlapping, inspection routines are performed to provide the data necessary for the inspection analysis. The specific inspection routine performed on the golf ball is selected based on the process being inspected, as will be described in further detail below in connection with exemplary applications of the principles of the present invention.

Figure 3:
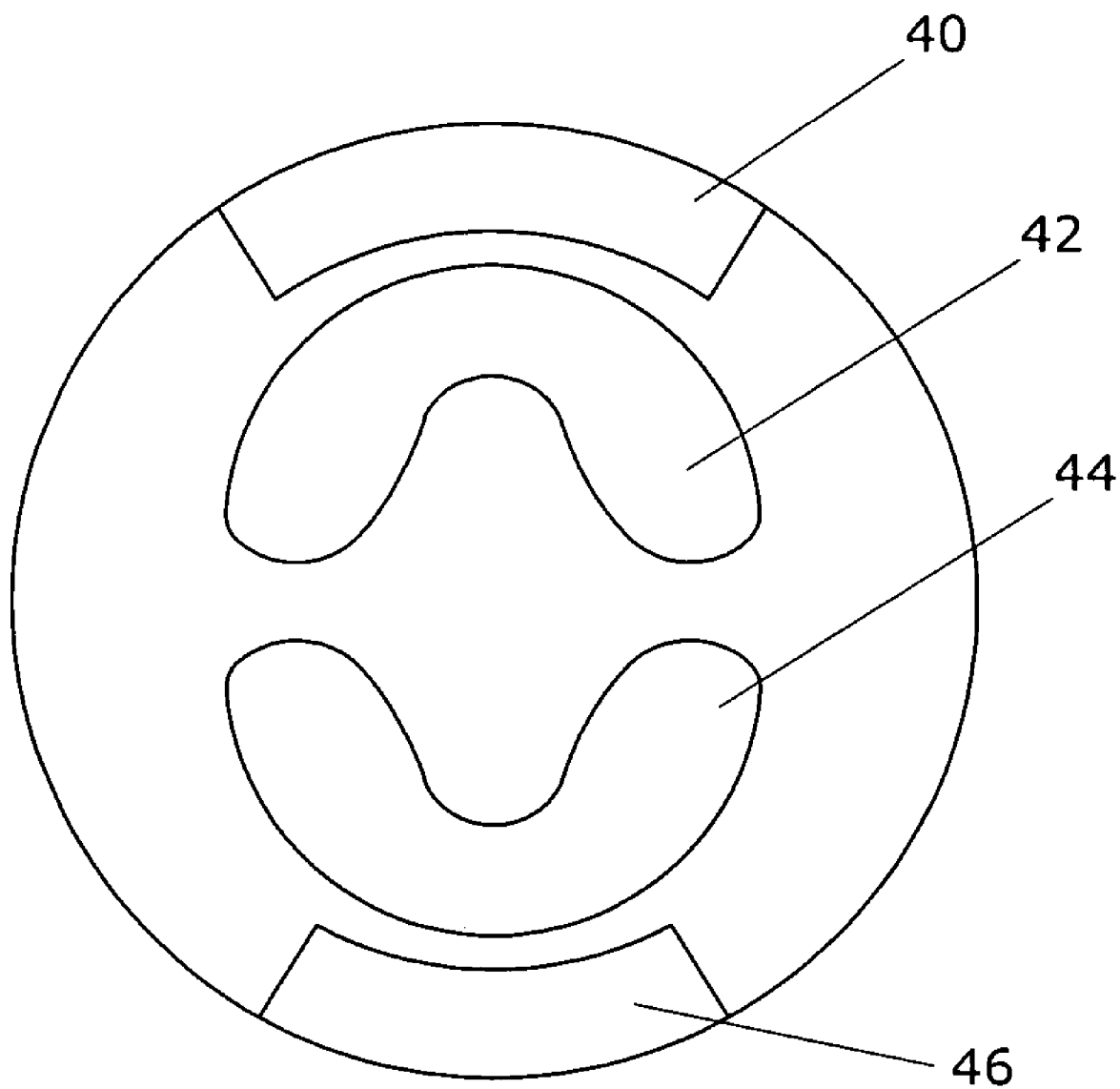
FIG. 3 is a schematic view of a golf ball showing regions of interest according to the present invention.

Analyzer 18 preferably utilizes a threshold analysis tool to analyze golf ball 12 to determine the uniformity of coverage of paint or other coatings. Threshold analysis generally involves counting the number of pixels at each brightness level and/or color and, optionally, arranging those levels into a histogram graph. Preferably, analyzer 18 divides each image obtained from imager 16 into various zones or regions of interest. The preferred regions are shown in FIG. 3: an upper pole 40, an upper toroid 42, a lower toroid 44, and a lower pole 46. These regions are chosen for convenience, as the equatorial areas of golf ball 12 are often very bright due to environmental lighting conditions. As such, the brightness of these regions as captured on the image may not provide accurate information regarding the uniform application of paint or other coatings on golf ball 12. A preferred threshold analysis tool is a histogram and pixel counting tool.

System 10 may be calibrated initially or periodically using a master ball, thereby determining a reference brightness level against which the brightness levels are compared. Alternatively, analyzer 18 maintains a table of the brightness levels of the regions of interest for a specific number of recently-viewed golf balls, for example, the previous 100 inspected golf balls on a first-in/first-out basis. The actual number of previously inspected balls whose information is included in the table may vary, although the sample size should be sufficiently large as not to skew the determination of the average. Analyzer 18 then determines, based upon mean value of the brightness levels in the table, the reference number for brightness in the region of interest. As such, analyzer 18 may adjust threshold levels for acceptable golf balls based upon this information, if the golf balls tested are consistently far brighter than expected or are consistently failing the inspection. Alternatively, the reference number may simply be selected by a user of system 10 based upon a theoretical or anticipated value.

Preferably, the analysis entails simply counting the total number of pixels having a brightness value above a threshold value for the region of interest. As will be recognized by those in the art, the analysis may also be based upon the total number of pixels having a brightness value below a threshold value for the region of interest, i.e., if the number of dark pixels is too high, the ball will be rejected. Alternatively, for each brightness level, the number of pixels are determined and arranged into a histogram graph to establish a brightness curve for golf ball 10. The center of the bell of the curve and the standard deviation is then computed to provide an overall brightness level for region of interest.

Figure 4:
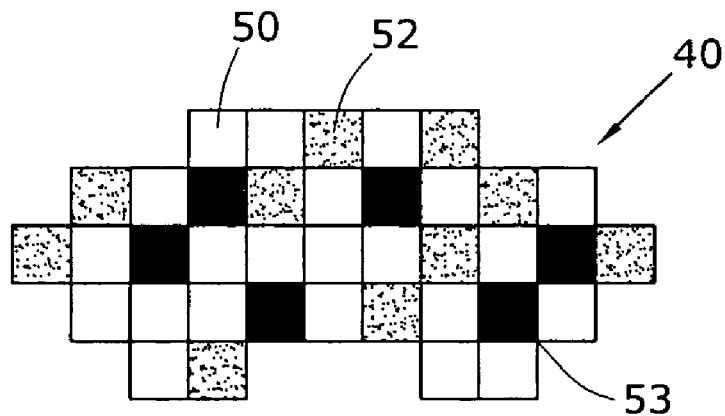
FIG. 4 shows a schematic of a digitized region of interest.
Figure 5:
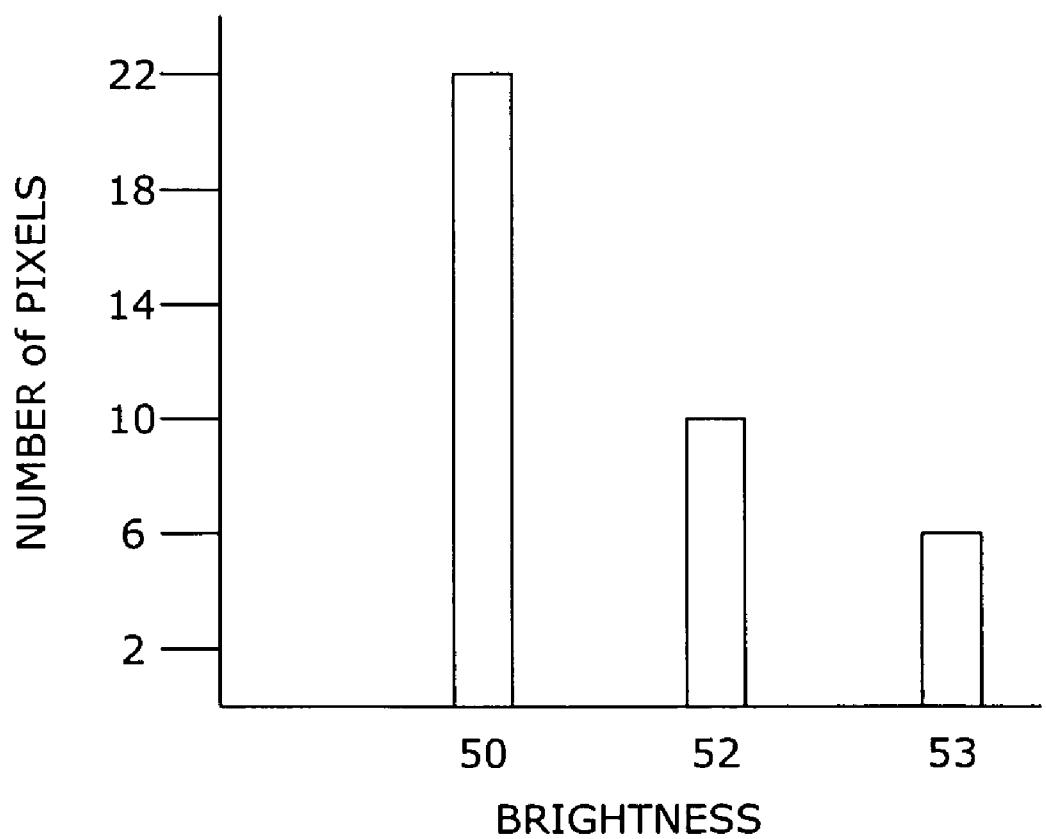
FIG. 5 shows a histogram graph of the brightness levels of the region of interest of a FIG. 4.

A simplified example of threshold analysis is shown in FIGS. 4 and 5. FIG. 4 shows the pixels in a portion of upper pole 40. For gray scale threshold analysis, each pixel is a uniform brightness level. For the purposes of a simplified example only, three different brightness levels are shown: a bright level 50, a medium brightness level 52, and a dark level 53. The pixels at each brightness level are counted and may be displayed as a histogram graph as shown in FIG. 5. A threshold brightness level is pre-determined, and the total number of pixels having a brightness level above the threshold is calculated. In the simplified example, all pixels having a bright 50 or medium brightness 52 level are counted, resulting in a total number of sufficiently bright pixels of 32. This resultant number is compared to an anticipated number. If the total number of sufficiently bright pixels is equal to or greater than the anticipated number, then the golf ball "passes" the inspection test and is permitted to move on to the next processing or packaging step. If the total number of sufficiently bright pixels is less than the anticipated number, then golf ball 12 "fails" the inspection test and is diverted from the manufacturing line.

In actual use, the number of pixels per region of interest will be substantially higher than illustrated. Further, the gradation of the gray scale used to determine brightness is finer. For example, brightness is preferably separated into 256 units with 8 bit resolution on the gray scale, with 0 defining black regions and 256 defining pure white regions, although any gray scale resolution may be used. Using this scale, Table 1 lists the preferred mean gray scale (i.e., brightness level) value for each of the regions of interest, which were determined using a master golf ball.

TABLE 1

Mean Gray Scale Values for Regions on Golf Ball

| Region of Interest | Mean Gray Scale Value |
|---|---|
| Top Pole | 210 |
| Top Toroid | 220 |
| Bottom Pole | 190 |
| Bottom Toroid | 160 |

Preferably, a ball is analyzed by counting the total number of pixels meeting or exceeding the mean gray scale value of the region of interest, i.e., the anticipated number is the mean gray scale value. This total number of pixels is compared with an expected value to determine if the region of interest in question is sufficiently bright to pass inspection. Preferably, at least 80% of the pixels in a region of interest have a brightness level of at least the mean gray scale value of the region of interest. For example, in a top pole 40 image made up of 10,000 pixels, at least 8,000 pixels in the image must have a brightness value of at least 210.

Alternatively, the brightness curve produced by fitting a curve to the histogram graph provides a mean brightness level for the image of golf ball 12. In order for golf ball 12 to "pass" this inspection, the mean brightness level of each region of interest of golf ball 12 must be at least 80% of the brightness levels as shown in Table 1. For example, the mean brightness level of top pole 40 must be at least 168 (i.e., 80% of 210). Table 2 shows the 80% threshold values for each of the regions of interest.

TABLE 2

80% Threshold Values for Gray Scale Regions of Interest

| Region of Interest | 80% Threshold Value |
|---|---|
| Top Pole | 168 |
| Top Toroid | 176 |
| Bottom Pole | 152 |
| Bottom Toroid | 128 |

Alternatively, instead of performing a complete gray scale analysis, a summation tool could be used. In this embodiment, each pixel is assigned a numerical value corresponding to the brightness level of the pixel, e.g., 0-256 on the gray scale discussed above. The sum of the numerical values of all of the pixels would result in a total brightness number for golf ball 12. This value would then be compared to a reference number. If the total brightness number for golf ball 12 is equal to or greater than the reference number, then golf ball 12 passes the inspection and may move to the next processing or packaging step. If the total brightness number for golf ball 12 is less than the reference number, the golf ball 12 is diverted. As discussed above, the reference number may be determined by either simply selecting the number based upon a theoretical or anticipated value, calibrating analyzer 18 with a master ball, or maintaining a running table of values from a specified number of previously inspected balls. For example, the reference number may be chosen as if each pixel had a brightness value of the 80% threshold value discussed above and shown in Table 2. Following this scheme, in a top pole 40 image composed of 10,000 pixels the reference number for the total brightness of top pole 40 would be 1,680,000. For a stricter passing criteria, the reference number could be determined as though each pixel has a brightness level equal to the mean gray scale value as discussed above and shown in Table 1. For example, for a top pole 40 image composed of 10,000 pixels, the reference number for the total brightness of top pole 40 would be 2,100,000.

Alternatively, an average of the pixel brightness can be used instead of the sum. For example, region of interest top pole 40 is composed of 10,000 pixels. The brightness level for each pixel is summed to yield a total brightness number, such as 2,800,000. This total brightness number may then be divided by the number of pixels to yield an average brightness value, in this example 280. This value is then compared to a table of threshold values, such as those listed in Tables 1 and 2. If the average brightness value is greater than the threshold value, then the ball passes to the next processing step. If the average brightness value is less than the threshold value, then the ball is diverted.

Yet another method in which a gray scale image may be analyzed is when filter 15 is a frequency band pass filter, such as a glass color filter. Filter 15 allows only those frequencies emitted by the optical brightener to pass through to imager 16. The resultant image is then analyzed for the percentage of the total surface area of region of interest contained on the image. In other words, the region of interest will be more or less complete depending upon the presence or absence of optical brighteners emitting at the proper frequency. If a threshold percentage of the image is complete, for example, if at least 98% of golf ball 12 is represented on the image, then golf ball 12 passes the inspection. The actual percentage of image completeness depends upon the desired level of quality control.

In order to appropriately define a region of interest on a particular image, analyzer 18 must be able to account for the motion of golf ball 12 as it travels along the transport mechanism, such as a conveyer belt, use to transfer golf ball 12 from station to station in the processing system. Due to this motion, the position of golf ball 12 within golf ball holder 20 may shift from ball to ball by a significant degree, by as much as half of the diameter of golf ball 12. Therefore, analyzer 18 must account for the shift in the locations of the regions of interest on images captured by imager 16. Conventional methods for locating specific parts of an image in vision inspection systems utilize various tools for repositioning the regions of interest. For example, a pattern matching tool that can return positional changes in location and rotation may be used to determine the offset between the current image and a stock image. Also commonly used in the art are simple edge finding tools that can determine the left side and bottom of the object in an image.

However, while any of the methods known in the art for repositioning the regions of interest from image to image may be used by analyzer 18, the conventional methods tend to over-reject golf balls 12. If ball 12 is marginally coated, ball 12 may be interpreted as having a slightly different shape or indistinct edges as compared to an ideal or reference ball. The regions of interest may therefore be located incorrectly on the image. As some of the regions of interest are very close to the edges of ball 12, namely top pole 40 and bottom pole 46 in the example described above, some of the black background may be inadvertently captured by analyzer 18 as part of the region of interest. These pixels could skew the brightness level of the region of interest falsely dark, thereby rejecting a ball that may be acceptable. Therefore, preferably, the ambient light in the vicinity of ball 12 will be increased in order to increase the overall brightness of ball 12 in the image. This makes the shape and edges of the ball 12 in the image more consistent for the purpose of repositioning the regions of interest.

Alternatively, imager 16 may capture a color image of golf ball 12. When imager 16 captures a color image, color for the digital or digitized images is produced by mixing primary colors using one of several color conventions such as RBG (Red-Green-Blue), CMYK (Cyan-Magenta-Yellow-Black). Using these color conventions, each pixel of the image is assigned a single color that is composed of smaller bits of primary colors. For example, using the RGB convention, red, green, and blue bits are combined to form various colors, such as white, where true white is a blend of red, green, and blue bits in equal parts. The precise shade of white may be altered by varying the relative percentages of the primary color bits, such as increasing the percentage of red bits. Of course, given the small size of each bit, the overall white color appears uniform. The number of bits per pixel is typically either 16 or 24. Colors may also be represented digitally in the color spectrum, or visible range of radiation, wherein each color has a unique range of wavelengths. For example, each primary color RBG has a unique spectral range. Any color, for example white, may be expressed as a combination of the RBG wavelengths.

It is observed that appropriately painted golf balls tend to have a high percentage of blue bits in the white color on a digital image. Additionally, it is observed that golf balls that have regions of incorrectly painted or unpainted surfaces have a high percentage of red bits in the white color on a digital image. As opposed to the gray scale threshold analysis described above, each region of interest can be assigned a brightness level according to the value of blue or red pixels contained in a region of interest. A threshold level of "blueness" is then required in order for the pixel to be counted as sufficiently bright. Each region of interest must include a minimum number of sufficiently bright pixels for golf ball 12 to pass the inspection. Alternatively, a threshold level of "redness" may be determined, and if the region of interest includes a minimum number of red pixels, golf ball 12 fails the inspection.

Alternatively, analyzer 18 may convert the color image provided by imager 16 into a black and white image. The resultant gray scale image may then be analyzed according to the techniques described above.

Yet another alternative method for analyzing a color image involves the use of the Hue Saturation Intensity (HSI) color purity parameter. On an HSI color wheel, the more pure or more highly saturated colors are located near the circumference of the color wheel which fades to white at the center of the wheel. This additional descriptive parameter allows for broader flexibility in defining and identifying colors. This finer gradation of color can be used to more selectively choose which colors count toward the total "blueness" or "redness" of the region of interest. This color purity parameter for red and blue can also be converted into a brightness value.

Yet another method of analyzing a color image is to learn a reference color and then match the color of a pixel against that reference color. For example, a tool may choose as a reference color a shade of blue having a particular frequency or range of frequencies that corresponds to the frequency emitted by the optical brightener, such as 400 to 500 nm. Then, any pixel with a shade falling within that range would be counted toward the overall brightness of the region of interest. Such a frequency analysis tool is available from DVT Corporation of Duluth, Ga. Preferably, a band pass color filter is used to help block out any undesirable ambient light or light from light source 14. This filter helps differentiate between light emitted from the optical brightener in the surface treatment and light merely reflected from the surface of the ball.

In appropriately locating the regions of interest on the color image, any of the techniques already described above with respect to gray scale images may be used. However, when analyzing a color image, an additional tool is available. To implement this technique, all ambient sources of light are blocked, and golf ball 12 is illuminated only with ultraviolet light and infrared light from light source 14. Analyzer 18 employs an analysis tool that distinguishes a red image and a blue image. The tool then uses only the red image to determine the shape and edges of golf ball 12 in the image. The regions of interest are positioned on the red image. The blue image is used for the determination of appropriate paint coverage, as the optical brighteners emit blue light.

Optionally, a monitor (not shown) can be used for displaying images of and additional information about the golf balls as they are inspected, and also for interfacing with analyzer 18. The image of the last inspected product may be displayed on the monitor so that operators may see the results of the inspection analysis, particularly if a defective golf ball has been detected. Highlights and color error markers can be set to emphasize important features or problems in the image displayed on the monitor. A freeze frame feature may be provided to freeze a defect on the screen of the monitor for close scrutiny while inspection continues. Such a feature also permits the image to be stored and displayed so that the operator may view the areas found defective by analyzer 18 while allowing the inspection process to continue. The frozen image remains displayed for an amount of time specified by the operator or until manually reset.

Thus, analyzer 18 can monitor the manufacturing process (including output quality), automatically track the production process, and generate statistics such as the total acceptable and defective products. Furthermore, when information is collected on a specific number of previously inspected golf balls, the information may be used to track the overall production quality, thereby providing information to a technician or line manager regarding the current state of the processing line. Additionally, analyzer 18 may be used to communicate production and status reports directly to an operator or to a host computer in a known manner. For example, analyzer 18 can report, such as to an operator or a programmable controller, inefficiencies such as cyclic defects, consecutive defects, percentage of defects, percentage yield, and/or forecasted yield. Because analyzer 18 can record the exact nature of a defect and also can provide a fast accurate breakdown of the types and quantities of each defect, analyzer 18 can be used to diagnose the precise problem in the processing apparatus that caused the detected defect.

Analyzer 18 also may be equipped to emit a signal or an alarm to notify the operator to review and analyze the defect image and determine what, if any, correction to the processing apparatus is necessary. Additionally, computer-generated error flags can be used to highlight defective areas of the product being inspected. This provides an immediate indication of the detected defect and the reason the golf ball was determined to be defective.

In addition to providing on-screen information and analyses, analyzer 18 may be used to generate concise, production history reports of the inspection statistics, e.g., number of defects, percentages, and production trends.

Production reports generated by analyzer 18 may include production totals or percents displaying the number of defective and acceptable products inspected, track production trends, throughput, various defect statistics, or defect results on a routine by routine basis. Such reports may be used to determine the general nature of various defects encountered in production and thereby to permit the operator/manufacturer to rectify any problems with or generally improve the system so as to result in improved production quality. Further, analyzer 18 may generate, or information provided by analyzer 18 may be used to generate, production charts graphically depicting the results, gathered over a period of time, of statistics pertaining to acceptable and defective products, relevant to overall production and/or individual production processes.

In addition to analyzing at least one characteristic of the golf ball being viewed, automated analyzer 18 also generates an analysis signal to affect the processing of the golf ball being inspected. Preferably, such signal is sent to a diversion device 28, as shown in FIG. 1, which performs a specified task based on the results of the analysis performed by analyzer 18. The specific diversion device 28 to be used depends on the process being performed on the golf ball as well as the next process to be performed. For instance, diversion device 28 may include reject and/or sorting mechanisms, programmable controllers for feedback to the production machinery, and production alarms or indicators which indicate a fundamental problem in the production equipment.

In one embodiment, a time delay for a controlled duration depending on production speed and station set-up, e.g., the distance between imager 16 and a diversion device 28, is implemented both between detection (by inspection system 10) and analysis (by analyzer 18) and between analysis (by analyzer 18) and analysis signal communication (to diversion device 28) to insure that the appropriate golf ball is acted upon.

A position detector may be used to determine the position of the golf ball between automated inspection system 10 and diversion device 28 so that the appropriate inspected golf ball is acted upon by diversion device 28. Any position detector known in the art, such as a detector determining absolute position, may be used. Means for determining and monitoring the velocity of the assembly line may also be provided to ensure further accuracy in determining the position of the golf ball to be acted upon. For example, a tach encoder may be useful in determining production rate for comparison with the analysis rate with which analyzer 18 may operate effectively. Alternatively, analyzer 18 may be appropriately programmed to send a signal to diversion device 28 at the appropriate time as determined by the production line speed and the spacing from the individual detecting apparatuses 36. In a preferred embodiment, a computer processor is utilized to track each ball as it passes through process station 10. The computer processor sends a signal to a particular processing station to indicate the particular ball which has arrived at the processing station 10 so that the process appropriate to that particular ball may be performed. The computer processor may be provided in any form desired, as known to those of ordinary skill in the art. For example, a programmable logic controller ("PLC") could communicate with analyzer 18 to track each ball. Each ball also or alternatively may be tracked by a computer to which signals from analyzer 18 are transmitted.

Diversion device 28 may perform any desired action on a golf ball which has been inspected by inspection system 12. For example, diversion device 28 may be a reject device which rejects any golf ball inspection system 12 has determined does not meet production standards. Alternatively, diversion device 28 may be a transfer device which transfers the inspected golf ball depending on conformance or nonconformance with production standards, such as a lever activated by a control signal to divert defective balls from further processing. Thus, a ball that does not meet production standards is removed, in any desired manner and at any desired time after inspection. Each golf ball that has undergone inspection by inspection system 12 may be transferred or conveyed to additional apparatus for further processing.

As will be appreciated, in accordance with the principles of the present invention, the above-described inspection system 10 as described above may be used in any of the various processing stations through which a game ball is passed during manufacture. Because each processing station performs a different process, inspection system 10 may be modified to account for the specific nature of the process being performed. For instance, processes which involve printing on or coating or painting of the golf ball will require analysis of the surface characteristics, but not necessarily the shape or contour, of the ball. In contrast, processes which involve the shaping or forming of a layer of the golf ball will require analysis of the shape or contour of the ball.

While it is apparent that the illustrative embodiments of the invention disclosed herein fulfill the preferred embodiments of the present invention, it is appreciated that numerous modifications and other embodiments may be devised by those skilled in the art. Examples of such modifications include slight variations of the numerical values discussed above. Hence, the numerical values stated above and claimed below specifically include those values and the values that are approximately or nearly close to the stated and claimed values. Therefore, it will be understood that the appended claims are intended to cover all such modifications and embodiments, which would come within the spirit and scope of the present invention.

We claim:

1. A method for inspecting a golf ball comprising the steps of:
   (i) obtaining at least one image of the golf ball using a sensor after a surface coating has been applied to at least a portion of the golf ball, wherein the image comprises an array of pixels and each pixel is represented by a numerical value indicative of a brightness level of each pixel and transferring the at least one image to an analyzer;
   (ii) ascertaining at least one region of interest on the golf ball;
   (iii) determining whether the surface coating was applied evenly on the region of interest, wherein a threshold pixel counting tool is employed to analyze the image;
   (iv) determining a total number of pixels above a threshold numerical value within the region of interest;
   (v) comparing the total number of pixels to a reference number; and
   (vi) diverting the golf ball if the total number is greater than the reference number.

2. The method of claim 1, wherein the reference number is selected by analyzing a master object.

3. The method of claim 1, wherein the reference number is selected by retaining the analysis of a predetermined number of previously inspected images and ascertaining the reference number therefrom.

4. The method of claim 1, wherein the reference number is chosen by a user.

5. The method of claim 1, wherein the image is captured in gray scale.

6. The method of claim 5, wherein a color filter is used to select a frequency band.

7. The method of claim 6, wherein a total number of bright pixels captures in the image is compared to an anticipated total number of bright pixels.

8. The method of claim 7, wherein the gray scale is separated into 256 units.

9. The method of claim 1, wherein the image is captured in color.

10. The method of claim 9, wherein the color scheme comprises RBG, CYMK, or Hue Saturation Intensity.

11. The method of claim 9, wherein the brightness correlates to a percentage of blue bits in the image.

12. The method of claim 11, wherein the blue bits whose degree of blueness exceeds a threshold value are counted towards the percentage.

13. The method of claim 9, wherein the brightness correlates to a percentage of red bits in the image.

14. The method of claim 13, wherein the red bits whose degree of redness exceeds a threshold value are counted towards the percentage.

15. The method of claim 9, wherein the brightness correlates to an intensity of a specific frequency band of a bit or a group of bits.

16. The method of claim 11, wherein the color scheme is Hue Saturation Intensity, and wherein the brightness correlates to a degree of color saturation of the red bits.

17. The method of claim 1, wherein an environment modification device is used prior to obtaining the image.

18. The method of claim 17, wherein the environment modification device is a light source.

19. The method of claim 18, wherein the light source is an ultraviolet light source.

20. The method of claim 18, wherein the light source is an infrared light source.

21. The method of claim 1, wherein a summation tool is employed to analyze the image.

22. The method of claim 21, wherein the summation tool further comprises:
summing the brightness level of each pixel in the array to determine a total brightness number for the golf ball; and comparing the total brightness number to a reference number.

23. The method of claim 22, wherein the reference number is selected by analyzing a reference object.

24. The method of claim 22, wherein the reference number is selected by retaining the analysis of a plurality of previously inspected images and extrapolating the reference number therefrom.

25. The method of claim 22, wherein the reference number is chosen by a user.

26. The method of claim 1, wherein an averaging tool is employed to analyze the image.

27. The method of claim 26, wherein the averaging tool further comprises: summing the brightness level of each pixel in the array to determine a total brightness number for golf ball; determining an average brightness number by dividing the total brightness number by a total number of pixels; and
comparing the average brightness number to a reference number.

* * * * *